United States Patent
Eun et al.

(10) Patent No.: US 8,223,351 B2
(45) Date of Patent: Jul. 17, 2012

(54) METHOD AND SYSTEM FOR CONTINUOUS FEED PRINTING SYSTEMS

(75) Inventors: Yongsoon Eun, Webster, NY (US); R. Enrique Viturro, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1001 days.

(21) Appl. No.: 12/194,714

(22) Filed: Aug. 20, 2008

(65) Prior Publication Data
US 2010/0046014 A1 Feb. 25, 2010

(51) Int. Cl.
*G06K 15/00* (2006.01)

(52) U.S. Cl. ......... 358/1.12; 358/1.9; 358/1.5; 358/412; 347/2; 347/14; 347/19; 347/104; 399/394; 399/395; 399/396; 474/11; 474/50; 474/69; 474/70; 474/148

(58) Field of Classification Search ............... 358/1.9, 358/1.5, 412, 1.12; 347/2, 14, 19, 104; 399/394, 399/395, 396; 474/11, 50, 69, 70, 148
See application file for complete search history.

(56) References Cited

U.S. PATENT DOCUMENTS

| | | | |
|---|---|---|---|
| 5,031,032 A | 7/1991 | Perregaux et al. | |
| 5,231,428 A | 7/1993 | Domoto et al. | |
| 5,473,513 A | 12/1995 | Quinn | |
| 5,545,913 A | 8/1996 | Quinn et al. | |
| 5,552,828 A | 9/1996 | Perregaux | |
| 5,604,362 A | 2/1997 | Jedlicka et al. | |
| 5,691,760 A | 11/1997 | Hosier et al. | |
| 5,748,344 A | 5/1998 | Rees | |
| 6,621,576 B2 | 9/2003 | Tandon et al. | |
| 6,972,403 B2 | 12/2005 | Martenson et al. | |
| 2005/0263958 A1 | 12/2005 | Knierim et al. | |
| 2006/0221124 A1 | 10/2006 | Guarino et al. | |
| 2008/0062219 A1* | 3/2008 | Mizes et al. | 347/19 |
| 2008/0124158 A1* | 5/2008 | Folkins | 399/396 |
| 2008/0170884 A1* | 7/2008 | Matsuda | 399/167 |

OTHER PUBLICATIONS

U.S. Appl. No. 11/773,549, filed Jul. 5, 2007.

* cited by examiner

*Primary Examiner* — Jacky X Zheng
(74) *Attorney, Agent, or Firm* — Fay Sharpe LLP (57) ABSTRACT

A method of measuring and correcting the Young's Modulus inline to eliminate its impact on image length variation during print runtime. The method includes intentionally perturbing the nominal operating condition of the web printing system which is controlled by the double reflex printing controller. The perturbation creates misregistration in a control target printed image that is detectable by in-situ sensors, from which Young's Modulus is estimated. Specifically, the web tension before the print zone is set differently from the web tension in the print zone to create misregistration. The error is detected by the inline sensors, and it is used to calculate the actual Young's Modulus. The implementation of the method consists of measuring the Young's Modulus at various frequencies. The correct Young's Modulus in then incorporated into the double reflex printing algorithm.

19 Claims, 6 Drawing Sheets

METHOD AND SYSTEM FOR CONTINUOUS FEED PRINTING SYSTEMS

BACKGROUND

The exemplary embodiment relates to registration of images in printing systems. It finds particular application in connection with a registration system for a multicolor printing system which compensates for fluctuations in the position of an image receiving surface between marking stations.

Ink jet printing involves ejecting ink droplets from orifices in a print head onto a receiving surface to form an image. The image is made up of a grid-like pattern of potential drop locations, commonly referred to as pixels. The resolution of the image is expressed by the number of ink drops or dots per inch (dpi), with common resolutions ranging between 200 dpi and 1200 dpi.

Ink-jet printing systems commonly utilize either a direct printing or offset printing architecture. In a typical direct printing system, ink is ejected from jets in the print head directly onto the final receiving media web, or web for short. In an offset printing system, the image is formed on an intermediate transfer surface and subsequently transferred to the final receiving web. The intermediate transfer surface may take the form of a liquid layer that is applied to a support surface, such as a drum. The printhead jets the ink onto the intermediate transfer surface to form an ink image thereon. Once the ink image has been fully deposited, the final receiving web is then brought into contact with the intermediate transfer surface and the ink image is transferred to the final receiving web.

The architecture of continuous feed (CF) direct marking (DM) printers includes the use of multiple printheads (or marking stations) distributed into several color printhead modules along the printing path. Some printers have as many as six color modules with four print units per color module incorporating fourteen printheads. Direct marking from an array of independent printheads on a continuous feed printer requires tight registration between the heads to prevent image artifacts. One of the phenomena observed in CF printing systems is the stretching of the web. This distortion of the web in the process direction causes image miss-registration and printed image length variation, the amounts of which are determined by web tension and Young's Modulus. The registration can be achieved, and the length variation can be eliminated by employing advanced techniques such as Double Reflex Printing (DRP), if Young's Modulus of the media is known. Details on double reflex printing can be found, for example, in U.S. Pat. Pub. No. 2008/0124158 A1, the disclosure of which is hereby incorporated by reference in its entirety. Measurement of the Young's Modulus is typically done by off-line experiments, as these measures are limited to small samples of the media. However, the Modulus can vary within a web roll, from the outer to the inner core of the roll, or from batch to batch, or by media types, which affects the printed image length, thereby having a negative impact with respect to the color-to-color registration.

The exemplary embodiments contemplate a new and improved method and system that resolves the above-referenced difficulties and others.

BRIEF DESCRIPTION

In one embodiment, a method of registering images in an imaging device with at least two marking stations is provided. The method comprises: generating a first set of timing signals for printing a registration target on a web of print media, wherein the first set of timing signals is generated via a double reflex printing algorithm; printing the registration target using the first set of timing signals; sensing the printed target with an image sensing unit and generating a digital image of the registration target; processing the digital image and computing a registration error growth rate for each marking station in the imaging device; modifying one or more parameters in the double reflex printing algorithm to compensate for the registration errors; generating a second set of timing signals via the double reflex printing algorithm; and reprinting the registration target using the second set of timing signals.

In another embodiment, a method is provided. The method comprises: creating detectable registration errors in a printed image by intentionally setting a differential web tension between a pre-print zone and a print zone in a web of print media having a given Young's modulus; printing an image using a double reflex printing algorithm; sensing the registration errors in the printed image; and adjusting the value of Young's Modulus in the double reflex printing algorithm until the registration errors are no longer increasing or decreasing.

In yet another embodiment, an image processing system is provided. The image processing system comprises: a first control mechanism operative to generate a first set of timing signals for printing a registration target on a web of print media, wherein the first set of timing signals is generated via a double reflex printing algorithm; a print engine for printing the registration target using the first set of timing signals; an image sensing unit operative to sense the printed target and generate a digital image of the registration target; and a second control mechanism. The second control mechanism is operative to: process the digital image and compute a registration error growth rate for each marking station in the imaging device; modify one or more parameters in the double reflex printing algorithm to compensate for the registration errors; and generate a second set of timing signals via the double reflex printing algorithm.

DETAILED DESCRIPTION

Aspects of the exemplary embodiments relate to an imaging device and to a registration system for an imaging device. The imaging device includes an extensible image receiving member, such as a web, which defines an image receiving surface that is driven in a process direction between marking stations. The process direction speed of the image receiving surface may vary over its length from a nominal set speed due, for example, to variations in stretch or deformation of the image receiving member and may vary over time due, for example to minor variations in the drive speed. The imaging surface thus has two degrees of freedom, defined by its speed and relative stretch in the receiving member.

The imaging device can include any device for rendering an image on print media, such as a copier, laser printer, bookmaking machine, facsimile machine, or a multifunction machine, all of which may generally be referred to as printers. The operation of applying images to print media, for example, graphics, text, photographs, etc., is generally referred to herein as printing or marking.

The image receiving member can be a web of print media, such as a continuous web of print media having a length substantially greater than its width and substantially greater than the distance between first and second marking stations. The print media can be paper, plastic, textile or other suitable physical print media substrate for images. In general, the web of print media is one which has sufficient extensibility in the process direction that differences in tension in the web can result in misregistration of images applied by the first and second print stations. While the image receiving member will frequently be described herein in terms of a web of paper, it is to be appreciated that other image receiving members are also contemplated.

As used herein, an image can comprise a pattern of applied marking medium such as ink or toner.

Figure 1:
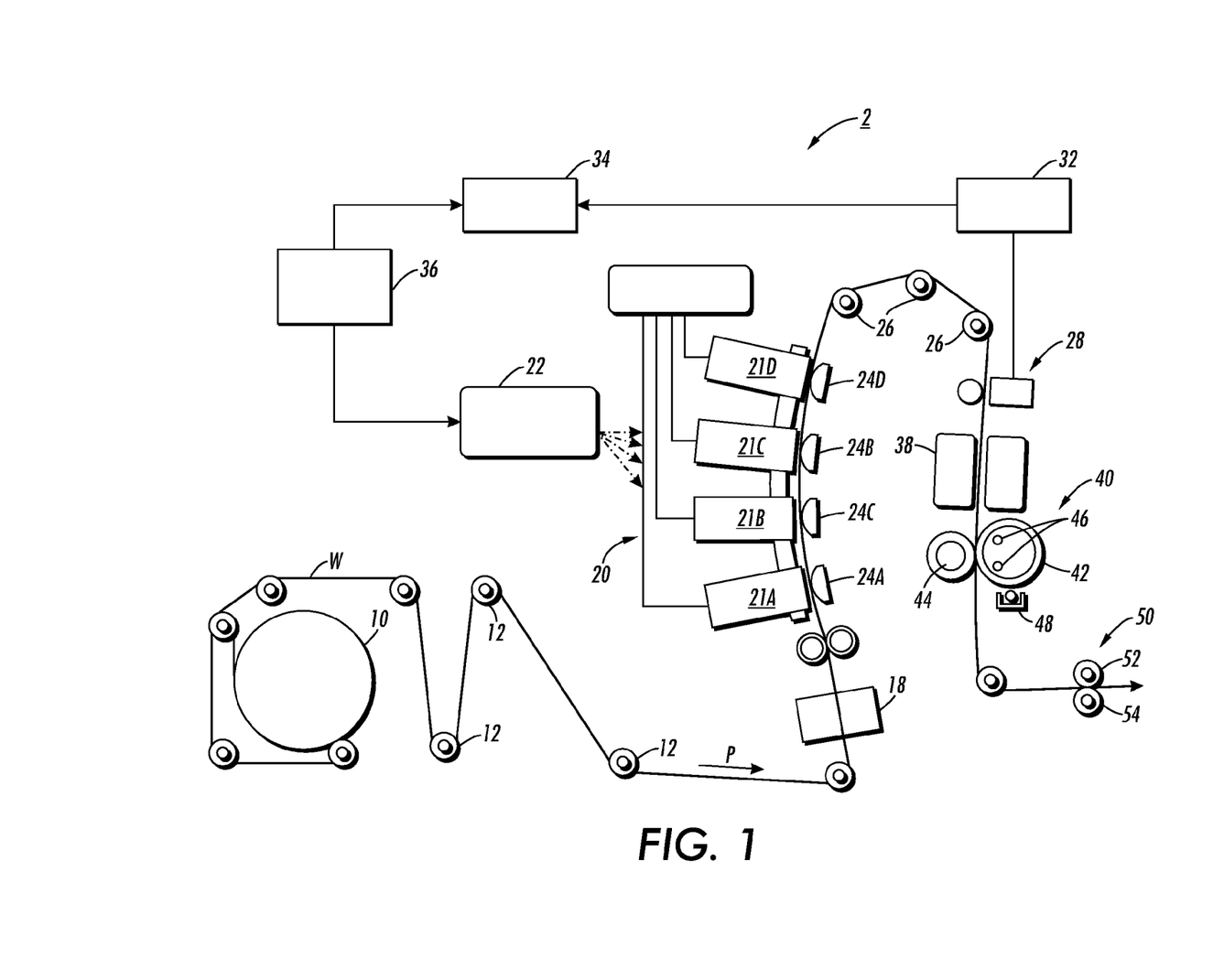
FIG. 1 is a simplified elevational view of a direct-to-sheet continuous web, phase change ink imaging device suitable for implementing aspects of the exemplary embodiments.

With reference now to FIG. 1, a direct-to-sheet, continuous-web, phase-change ink printer (or imaging device) 2 suitable for implementing aspects of the exemplary method is illustrated. Of course, it is to be understood that other types of printers are contemplated. A very long (i.e., substantially continuous) web W of "substrate" (paper, plastic, or other printable material), supplied on a spool 10, is unwound as needed, propelled by a variety of motors (not shown). A set of rolls 12 controls the tension of the unwinding web W as it moves through a path. Along the path is a preheater 18, which brings the web W to an initial predetermined temperature. The preheater 18 can rely on contact, radiant, conductive, or convective heat to bring the web W to a target preheat temperature of about 30° C. to about 70° C.

The web W moves through a printing station 20 including a series of printheads (or marking stations) 21A, 21B, 21C, and 21D, each printhead effectively extending across the width of the web and being able to place ink of one primary color directly (i.e., without use of an intermediate or offset member) onto the moving web, and an image processor 22 that sends image data to each printhead. As is generally familiar, each of the four primary-color images placed on overlapping areas on the web W combine to form a full-color image, based on the image data sent to each printhead. There may be multiple printheads for each primary color; the printheads can each be formed into a single linear array; the function of each color printhead can be divided among multiple distinct printheads located at different locations along the process direction; or the printheads or portions thereof can be mounted movably in a direction transverse to the process direction P, such as for spot-color applications.

Associated with each primary color printhead is a backing member 24A, 24B, 24C, 24D, typically in the form of a bar or roll, which is arranged substantially opposite the printhead on the other side of web W. Each backing member is used to position the web W so that the gap between the printhead and the sheet stays at a known, constant distance.

The ink directed to web W is typically a "phase-change ink," that is, the ink is substantially solid at room temperature and substantially liquid when initially jetted onto the web W. Such inks are typically heated to about 80° C. to 140° C., and thus in liquid phase, upon being jetted onto the web W. The liquid ink cools down upon hitting the web W. Other inks of interest are "UV inks," which in addition to cooling are hardened by exposing the ink to ultra violet radiation.

As the partially-imaged web W moves to receive inks of various colors throughout the printing station 20 it is required that the temperature of the web be maintained to within a given range for maintaining image quality, in particular, maintaining constant ink lateral spread (i.e., across the width of web W, such as perpendicular to process direction P) and constant ink penetration of the web. However, since ink is jetted at a temperature typically significantly higher than the receiving web's temperature, the surrounding web will be heated. Therefore, temperature of the members in contact with or near the web W must be adjusted so that that the desired web temperature is maintained.

Depending on the thermal properties of the particular inks and the web W, this web temperature uniformity may be achieved by preheating the web with preheat unit 18 and using uncontrolled backer members, and/or by controlling the different backer members 24A, 24B, 24C, 24D to different temperatures to keep the substrate temperature substantially constant throughout the printing station. Temperature sensors (not shown) associated with the web W may be used with a control system to achieve this purpose, as well as systems for measuring or inferring (from the image data, for example) how much ink of a given primary color from a printhead is being applied to the web W at a given time. The various backer members can be controlled individually, using input data from the printhead adjacent thereto as well as from other printheads in the printing station.

Following the printing zone 20 along the web path is a series of tension rolls 26, an image sensing unit 28, a white baker roll 30, and a signal processing unit 32. The image sensing unit 28 may comprise any type of electronic sensor including a charge coupled device (CCD) array or a full width array (or imaging bar). A CCD or full width array typically comprises one or more linear arrays of photo-sites, wherein each linear array may be sensitive to one or more colors. In a color image capture device, the linear arrays of photo-sites are used to produce electrical signals which are converted to color image data representing the scanned document. However, in a black-and-white scanner, generally, only one linear array of photo-sites is used to produce the electrical signals that are converted to black and white image data representing the image of the scanned document. Examples of full width arrays that can be used are disclosed in, for example, U.S. Pat. No. 5,031,032 to Perregaux, et al.; U.S. Pat. No. 5,473,513 to Quinn; U.S. Pat. No. 5,545,913 to Quinn et al.; U.S. Pat. No. 5,552,828 to Perregaux; U.S. Pat. No. 5,604,362 to Jedlicka et al.; U.S. Pat. No. 5,691,760 to Hosier et al.; U.S. Pat. No. 5,748,344 to Rees; and U.S. Pat. No. 6,621,576 to Tandon et al., the disclosures of which are hereby incorporated by reference in their entirety.

Also shown is a midheater 38, which can use contact, radiant, conductive, and/or convective heat to bring the web W to the target temperature. The midheater 38 brings the ink placed on the web to a temperature suitable for desired properties when the ink on the web is sent through the spreader 40.

Following the midheater 38 along the path of web W is a "spreader" 40, which applies a predetermined pressure, and in some implementations, heat, to the web W. The function of the spreader 40 is to take what are essentially isolated droplets of ink on web W and smear them out to make a continuous layer by pressure, and, in one embodiment, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rolls such as image-side roll 42 and pressure roll 44 that apply heat and pressure to the web W. Either roll can include heat elements such as 46 to bring the web W to a temperature in a range from about 35° C. to about 80° C.

The spreader 40 can also include a cleaning/oiling station 48 associated with image-side roll 42, suitable for cleaning and/or applying a layer of some lubricant or other material to the roll surface. The midheater 38 and the spreader 40 can be combined within a single unit, with their respective functions occurring relative to the same portion of web W simultaneously.

The printer shown further includes a "glosser" 50, whose function is to change the gloss of the image (such a glosser can be considered an "option" in a practical implementation). The glosser 50 applies a predetermined combination of temperature and pressure, to obtain a desired amount of gloss on the ink that has just been spread by spreader 40. Additionally, the glosser roll surface may have a texture that the user desires to impress on the ink surface. The glosser 50 includes two rolls (image-side roll 52 and pressure roll 54) forming a nip through which the web W passes.

In each of the spreader 40 and glosser 50, the image side roll 42 or 52 contacting the inked side of the web is typically reasonably hard, such as being made of anodized aluminum. Elastomeric or rubbery pressure rolls of one or more layers can be provided.

Detailed and independent control of the respective temperatures associated with spreader 40 and glosser 50 enables gloss adjustment given particular operating conditions and desired print attributes.

Following passage through the spreader 40 and glosser 50, the printed web can be imaged on the other side, and then cut into pages, such as for binding (not shown). Although printing on a substantially continuous web is shown in the embodiment, the embodiments can be applied to a cut-sheet system as well.

Images are formed on the web W as follows. The machine controller 36 sends information on images to be printed to the image processing unit 22. The machine controller 36 also sends web motion information to the double reflex controller 34. Based on the web motion information, the double reflex controller 34 generates timing signals for each print head as to when to jet inks. Details on double reflex controller function can be found, for example, in U.S. Pat. Pub. No. 2008/0124158 A1, the disclosure of which is hereby incorporated by reference in its entirety. The print head interface controller 25 (need to mark this in the figure) receives the timing signals from the double reflex controller 34 and also receives image data from the image processing unit 22 and operates nozzles in the print heads 21A, 21B, 21C, 21D to jet inks.

The image then moves along and passes under the image sensing unit 28. The sensing unit 28 captures a set of selected images and sends the captured image data to the signal processing unit 32. The signal processing unit 32 analyzes the data, quantifies misregistration, and sends adjustments to remove registration errors to the double reflex controller 34. Then, the controller 34 adjusts ink jet timings accordingly.

Figure 2:
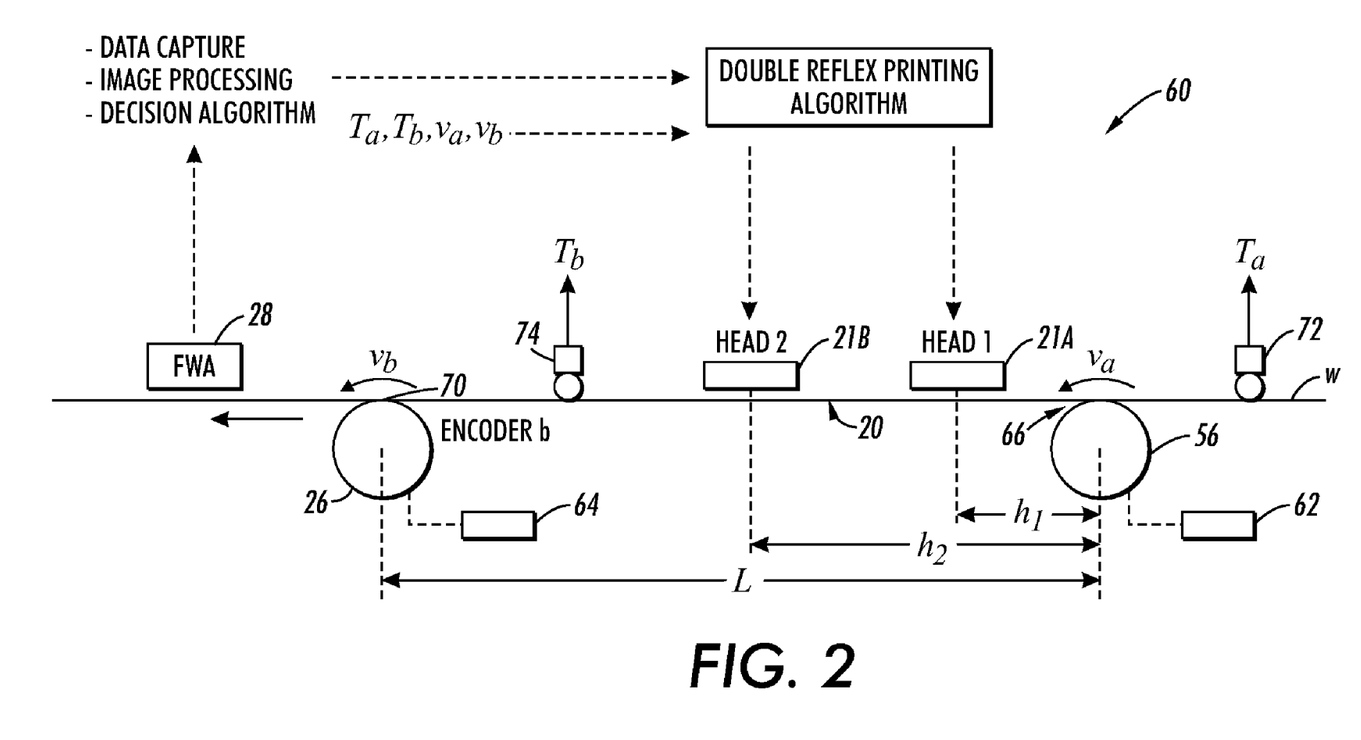
FIG. 2 is a block diagram of an embodiment of a registration system for the imaging device.

With reference now to FIG. 2, an exemplary embodiment of a registration system 60 for an imaging device such as the imaging device 2 of FIG. 1 is shown. FIG. 2 shows only two print heads, 21A and 21B, for ease of representation, although it is to be appreciated that three, four, or more print heads may be provided, as shown in FIG. 1. The registration system 60 includes two encoders 62 and 64 for web velocity measurement at the points 66 and 70, respectively, and two loadcells 72 and 74 for measuring tension of the web span before the nip 66 and of the span 20, respectively.

In this example, $T_a$ is the tension before the print zone 20 and $T_b$ is the tension in the print zone 20, $v_a$ and $v_b$ are the velocities at the first and second encoders 62, 64, respectively, $h_1$ represents the location of the first printhead 21A, $h_2$ represents the location of the second printhead 21B, and L represents the length of the web span.

Denote the time that the printhead 21A prints the k-th image line by $t_1(k)$ and that for the second printhead 21B by $t_2(k)$, respectively. Then, the double reflex controller 34 generates the timing signals $t_1(k)$ and $t_2(k)$ by processing the measurements $v_a$, $v_b$, $T_a$ and $T_b$ such that $t_1(k)$ and $t_2(k)$ satisfy the following equations (1) and (2):

$$h_2 - h_1 = \frac{1}{1+T_b(t_2(1))/EA} \int_{t_1(1)}^{t_2(1)} \left(1-\frac{h_1}{L}\right)\frac{v_a}{1+T_a/EA} + \left(\frac{h_1}{L}\right)\frac{v_a}{1+T_b/EA} dt \quad (1)$$

$$d = \int_{t_i(k)}^{t_i(k+1)} \left(1-\frac{h_i}{L}\right)\frac{v_a}{1+T_a/EA} + \left(\frac{h_i}{L}\right)\frac{v_a}{1+T_b/EA} dt, \quad (2)$$

$$i = 1, 2., k = 1, 2, 3, \ldots$$

where, d is the desired dot to dot distance (e.g., 42.33 um for 600 dpi image), E is the Young's Modulus of the web W, and A is the cross section area of the web W.

The exemplary method consists of determining and correcting the Young's Modulus in the web control algorithm by (a) creating detectable registration errors by intentionally setting a differential web tension between the pre-print zone and the print zone, (b) sensing the error in the printed image, and (c) adjusting the Young's Modulus in the double reflex printing algorithm until increasing/decreasing trend in the errors is eliminated. The implementation of the method includes measuring the Young's Modulus at machine cycle up and runtime, the late measurement at some frequency (expected to be low frequency) during the job.

Detectable registration errors are created by intentionally setting the tensions before the print zone 20 and in the print zone 20 differently, i.e. $T_a \neq T_b$. Nominally the tensions are set identical, i.e., $T_a = T_b$. When tensions are set differently, and there exists mismatch between the Modulus value used in the algorithm, denoted by $EA_{algorithm}$, and the actual value, $EA_{actual}$, the registration errors are created as prints are made, moreover, the errors grow with a rate approximated by:

$$\text{rate(m/scanline)} \cong \frac{(h_2-h_1)}{L} v_n (T_a - T_b) \frac{1}{f_n} \left( \frac{1}{EA_{algorithm}} - \frac{1}{EA_{true}} \right) \quad (3)$$

where:

$v_n$: nominal web speed $f_n$: nominal printing frequency $EA_{algorithm}$: Web media modulus times area, value used in the algorithm $EA_{true}$: Web media modulus times area, actual value It should be noted that any in-situ sensor that detect registration errors is limited in the following sense: it cannot measure absolute distance on the web without knowing how much the web is stretched and how fast the web is moving. However, it can measure relative distance with higher accuracy. In other words, it cannot measure, in the process direction, the absolute dot-to-dot distance. However, it can measure if the distance is changing. As noted in Equation (3), the registration errors grow over time, thus, the exemplary method creates registration errors detectable by an in-situ sensor in this sense.

Figure 3:
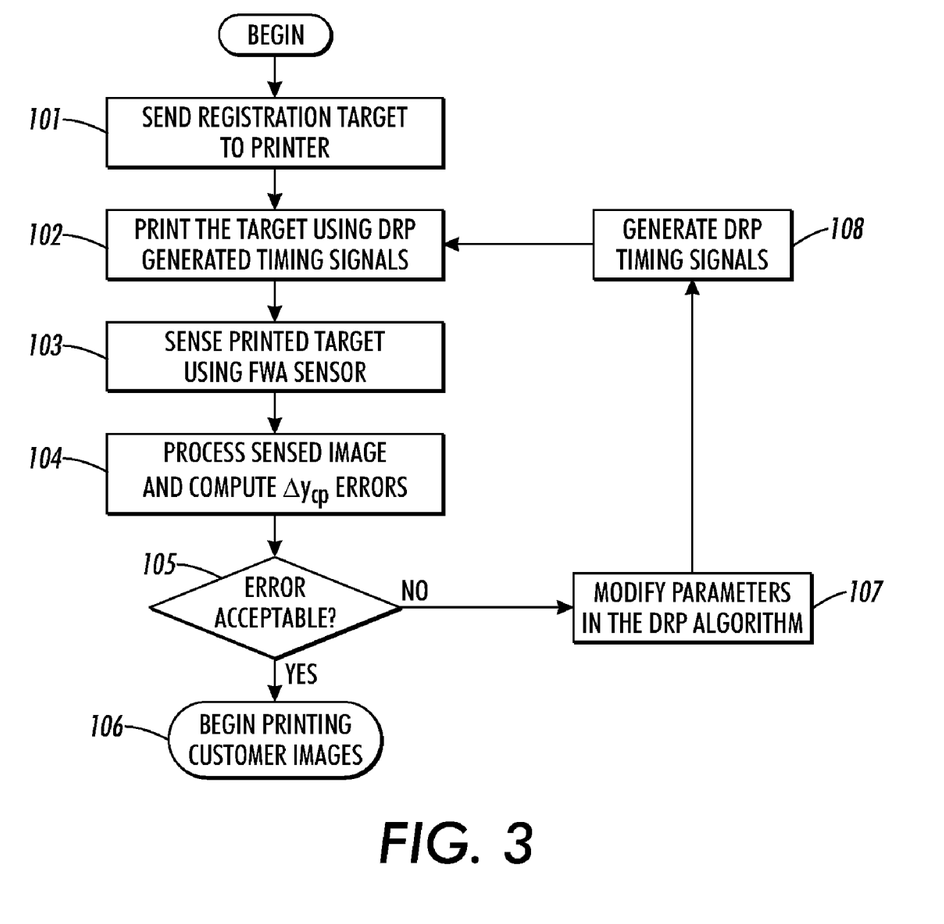
FIG. 3 is a flowchart of an exemplary print correction method.

With reference now to FIG. 3, the exemplary method is presented more detail. Initially, a registration target is sent to the printer (101). The registration target, for example, may consist of a collection of short dashes printed by selected printheads. See, for example, U.S. Pat. Pub. No. 2008/0062219 A1, the disclosure of which is hereby incorporated by reference in its entirety. The target is printed using double reflex printing-generated timing signals (102).

In one embodiment, the parameters in the DRP algorithm are set as follows:

Set $T_b = 2 * T_a$

Choose $EA_{min}$ and $EA_{max}$ such that
$EA_{min} < EA_{true} < EA_{max}$

Set $EA_{algorithm} = (EA_{min} + EA_{max})/b\ 2$, where $EA_{min}$ and $EA_{max}$ are estimated lower and upper bounds of the actual EA. Literature on materials property can be used to find the bounds. In this example, the initial value for $EA_{algorithm}$ is set by the mean of $EA_{min}$ and $EA_{max}$, but it can be set as any value in between $EA_{min}$ and $EA_{max}$.

The printed target is then sensed by the full width array sensor 28 (103). The sensed image is processed by the sensed image signal processor 32 (104). In this regard, the registration error growth rate for each print head is determined.

Next, a determination is made as to whether such error is acceptable (105). Such decision may be made automatically by a pre-set error threshold, or may be made manually by prompting the amount of error in a console display and wait for the operator input. If acceptable, then the customer images are printed (106). Otherwise, the parameters in the DRP algorithm are modified (107).

As noted in Equation (3), the error rate is positive if $EA_{algorithm} > EA_{actual}$ and negative if $EA_{algorithm} < EA_{actual}$. Therefore, based on the sign of the rate, the parameter $EA_{algorithm}$ needs to be adjusted. Any algorithm that achieves the convergence of $EA_{algorithm}$ to $EA_{actual}$ may be used. As an example, the following rules, known as the bisection search method, may be applied:

IF (rate)>0

Set $EA_{max} = EA_{algorithm}$

Set $EA_{algorithm} = (EA_{min} + EA_{max})/2$

IF (rate)<0

Set $EA_{min} = EA_{algorithm}$

Set $EA_{algorithm} = (EA_{min} + EA_{max})/2$

Thus, new DRP timing signals are generated (108). Once again, the target is printed, this time using the new DRP-generated timing signals. The process is repeated until the errors are acceptable.

Figure 4:
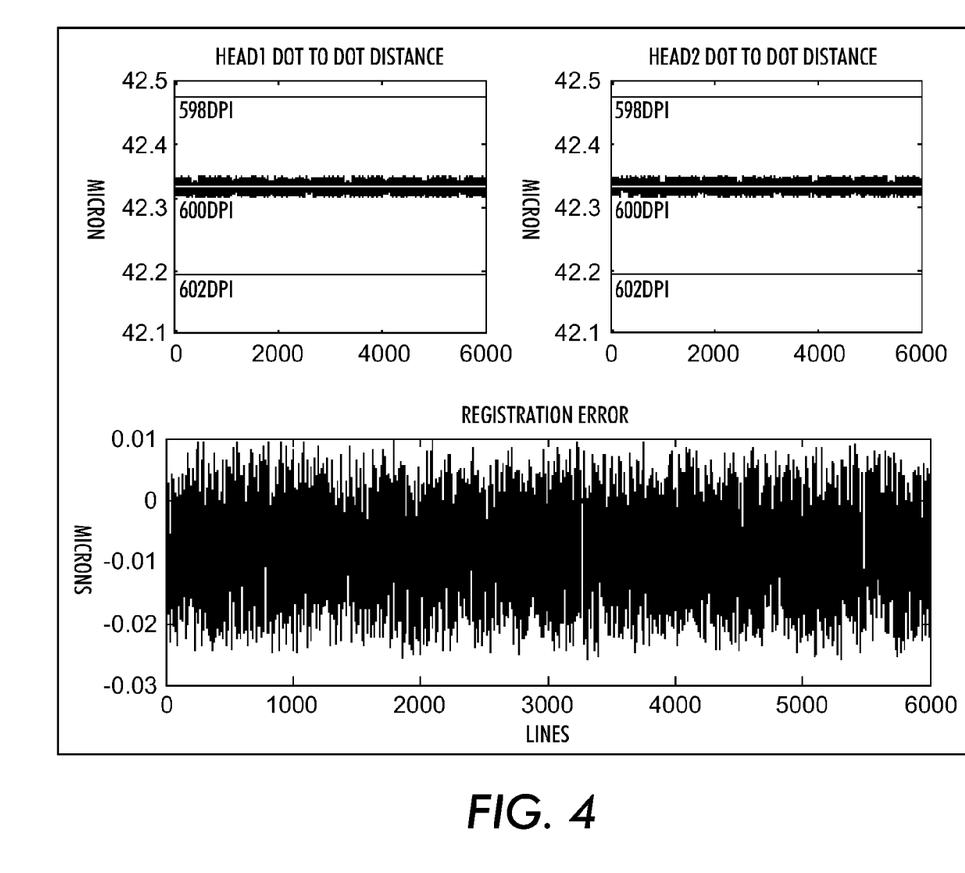
FIG. 4 is a chart illustrating registration performance in a simulation in accordance with aspects of the exemplary method.

Assuming double reflex printing is used, three cases are considered to illustrate this point:

1) A 6000 line image is printed under nominal operating condition ($T_a = T_b$). The actual Young's Modulus is $E = 2 \times 10^9 N/m^2$ and the same value is used in the double reflex algorithm. Registration performance for this case is shown in FIG. 4.

Figure 5:
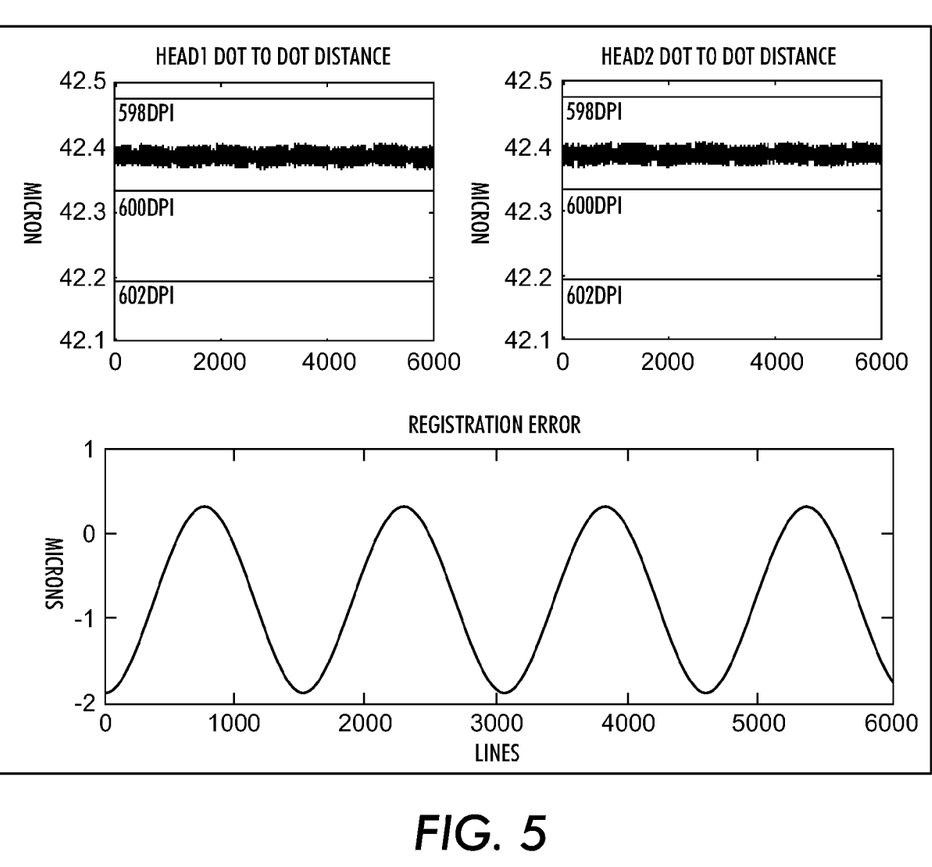
FIG. 5 is a chart illustrating registration performance in another simulation in accordance with aspects of the exemplary method.

2) A 6000 line image is printed under nominal operating condition ($T_a = t_b$). The actual Young's Modulus is $E = 2 \times 10^9 N/m^2$, while the value used in the algorithm is $E = 1 \times 10^9 N/m^2$. Registration performance for this case is shown in FIG. 5.

Figure 6:
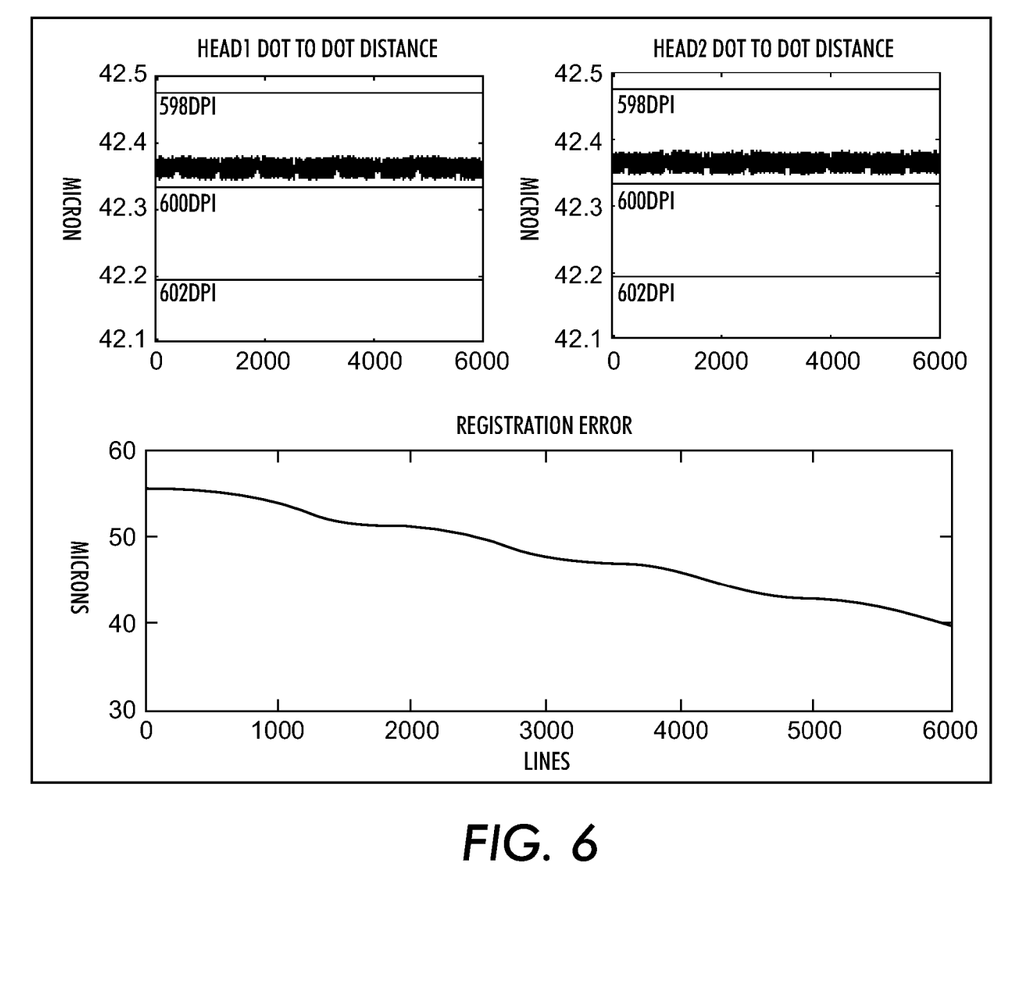
FIG. 6 is a chart illustrating registration performance in yet another simulation in accordance with aspects of the exemplary method.

3) A 6000 line image is printed under perturbed operating condition ($T_a = T_b/2$). The actual Young's Modulus is $E = 2 \times 10^9 N/m^2$, while the value used in the algorithm is $E = 1 \times 10^9 N/m^2$. Registration performance for this case is shown in FIG. 6.

Thus, a method of measuring and correcting the Young's Modulus inline to eliminate its impact on image length variation during print runtime is disclosed. The method includes intentionally perturbing the nominal operating condition of the web printing system of which print registration is achieved by the double reflex printing controller. The perturbation creates misregistration in a control target printed image only if there is mismatch between the actual Modulus of the web and the value used in the double reflex algorithm. The misregistration is detectable by in-situ sensors, from which Young's Modulus is estimated. Specifically, the web tension before the print zone is set differently from the web tension in the print zone to create misregistration. The error is detected by the inline sensors, and it is used to calculate the actual Young's Modulus. The implementation of the method consists of measuring the Young's Modulus at machine cycle up and runtime, the late measurement at some frequency (expected to be low frequency) during the job. The correct Young's Modulus is then incorporated into the double reflex printing algorithm.

It is to be understood that the method described above may be applied to other known printing methods such as xerographic CF printing and UV ink CF printing.

Portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the exemplary embodiment is not described with reference to any particular programming language. It will be appreciated that a variety of programming languages may be used to implement the teachings of the exemplary embodiment as described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of registering images in an imaging device with at least two marking stations, the method comprising:
   generating a first set of timing signals for printing a registration target on a web of print media, wherein the first set of timing signals is generated via a double reflex printing algorithm;
   printing the registration target using the first set of timing signals;
   sensing the printed registration target with an image sensing unit and generating a digital image of the registration target;
   processing the digital image and computing a registration error growth rate for each marking station in the imaging device;
   modifying one or more parameters in the double reflex printing algorithm to compensate for the registration error growth rate;
   generating a second set of timing signals via the modified double reflex printing algorithm; and
   reprinting the registration target using the second set of timing signals.

2. The method of claim 1, wherein the registration target comprises a collection of short dashes printed by selected marking stations.

3. The method of claim 1, wherein the image sensing unit comprises a full width array.

4. The method of claim 1, wherein the first set of timing signals the timing signals are represented by $t_1(k)$ and $t_2(k)$ and are generated by processing the measurements $v_a$, $v_b$, $T_a$ and $T_b$ such that $t_1(k)$ and $t_2(k)$ satisfy the following equations (1) and (2):

$$h_2 - h_1 = \frac{1}{1+T_b(t_2(1))/EA} \int_{t_1(1)}^{t_2(1)} \left(1 - \frac{h_1}{L}\right) \frac{v_a}{1+T_a/EA} + \left(\frac{h_1}{L}\right) \frac{v_a}{1+T_b/EA} dt \quad (1)$$

$$d = \int_{t_i(k)}^{t_i(k+1)} \left(1 - \frac{h_i}{L}\right) \frac{v_a}{1+T_a/EA} + \left(\frac{h_i}{L}\right) \frac{v_a}{1+T_b/EA} dt, \quad (2)$$

$i = 1, 2, k = 1, 2, 3, \ldots$ where, d is the desired dot to dot distance, E is the Young's Modulus of the web, and A is the cross section area of the web.

5. The method of claim 4, wherein parameters in the double reflex printing algorithm are set as follows:

Set $T_b = 2^* T_a$

Choose $EA_{min}$ and $EA_{max}$ such that $EA_{min} < EA_{true} < EA_{max}$

Set $EA_{algorithm} = (EA_{min} + EA_{max})/2$, where $EA_{min}$ and $EA_{max}$ are estimated lower and upper bounds of the actual EA.

6. The method of claim 5, wherein the registration error growth rate is positive if $EA_{algorithm} > EA_{actual}$ and negative if $EA_{algorithm} < EA_{actual}$.

7. The method of claim 6, further comprising:
   adjusting the parameter $EA_{algorithm}$ according to the following rules:
   IF (rate)>0

Set $EA_{max} = EA_{algorithm}$

Set $EA_{algorithm} = (EA_{min} + EA_{max})/2$

IF (rate)<0

Set $EA_{min} = EA_{algorithm}$

Set $EA_{algorithm} = (EA_{min} + EA_{max})/2$.

8. A method comprising:
   creating detectable registration errors in a printed image by intentionally setting a differential web tension between a pre-print zone and a print zone in a web of print media having a given Young's modulus;
   printing an image using a double reflex printing algorithm;
   sensing the registration errors in the printed image and determining a registration error growth rate; and
   adjusting the value of Young's Modulus in the double reflex printing algorithm until the registration error growth rate is no longer increasing or decreasing.

9. The method of claim 8, wherein the double reflex printing algorithm comprises generating a set of timing signals represented by $t_1(k)$ and $t_2(k)$ by processing the measurements $v_a$, $v_b$, $T_a$ and $T_b$ such that $t_1(k)$ and $t_2(k)$ satisfy the following equations (1) and (2):

$$h_2 - h_1 = \frac{1}{1+T_b(t_2(1))/EA} \int_{t_1(1)}^{t_2(1)} \left(1 - \frac{h_1}{L}\right) \frac{v_a}{1+T_a/EA} + \left(\frac{h_1}{L}\right) \frac{v_a}{1+T_b/EA} dt \quad (1)$$

$$d = \int_{t_i(k)}^{t_i(k+1)} \left(1 - \frac{h_i}{L}\right) \frac{v_a}{1+T_a/EA} + \left(\frac{h_i}{L}\right) \frac{v_a}{1+T_b/EA} dt, \quad (2)$$

$i = 1, 2, k = 1, 2, 3, \ldots$ where, d is the desired dot to dot distance, E is the Young's Modulus of the web, and A is the cross section area of the web.

10. The method of claim 8, wherein parameters in the double reflex printing algorithm are set as follows:

Set $T_b = 2*T_a$

Choose $EA_{min}$ and $EA_{max}$ such that $EA_{min} < EA_{true} < EA_{max}$

Set $EA_{algorithm} = (EA_{min} + EA_{max})/2$, where $EA_{min}$ and $EA_{max}$ are estimated lower and upper bounds of the actual EA.

11. The method of claim 10, wherein the registration error growth rate is positive if $EA_{algorithm} > EA_{actual}$ and negative if $EA_{algorithm} < EA_{actual}$.

12. The method of claim 11, further comprising:
adjusting the parameter $EA_{algorithm}$ according to the following rules:
IF (rate)>0

Set $EA_{max} = EA_{algorithm}$

Set $EA_{algorithm} = (EA_{min} + EA_{max})/2$

IF (rate)<0

Set $EA_{min} = EA_{algorithm}$

Set $EA_{algorithm} = (EA_{min} + EA_{max})/2$.

13. An image processing system comprising:
a first control mechanism operative to generate a first set of timing signals for printing a registration target on a web of print media, wherein the first set of timing signals is generated via a double reflex printing algorithm;
an imaging device with at least two marking stations for printing the registration target using the first set of timing signals;
an image sensing unit operative to sense the printed registration target and generate a digital image of the registration target; and
a second control mechanism operative to:
process the digital image and compute a registration error growth rate for each marking station in the imaging device;
modify one or more parameters in the double reflex printing algorithm to compensate for the registration error growth rate; and
generate a second set of timing signals via the modified double reflex printing algorithm.

14. The system of claim 13, wherein the registration target comprises a collection of short dashes printed by selected marking stations.

15. The system of claim 13, wherein the image sensing unit comprises a full width array.

16. The system of claim 13, wherein the first set of timing signals the timing signals are represented by $t_1(k)$ and $t_2(k)$ and are generated by processing the measurements $v_a$, $v_b$, $T_a$ and $T_b$ such that $t_1(k)$ and $t_2(k)$ satisfy the following equations (1) and (2):

$$h_2 - h_1 = \frac{1}{1+T_b(t_2(1))/EA} \int_{t_1(1)}^{t_2(1)} \left(1-\frac{h_1}{L}\right)\frac{v_a}{1+T_a/EA} + \left(\frac{h_1}{L}\right)\frac{v_a}{1+T_b/EA} dt \quad (1)$$

$$d = \int_{t_i(k)}^{t_i(k+1)} \left(1-\frac{h_i}{L}\right)\frac{v_a}{1+T_a/EA} + \left(\frac{h_i}{L}\right)\frac{v_a}{1+T_b/EA} dt, \quad (2)$$

$$i = 1, 2., \quad k = 1, 2, 3,$$

where, d is the desired dot to dot distance, E is the Young's Modulus of the web, and A is the cross section area of the web.

17. The system of claim 16, wherein parameters in the double reflex printing algorithm are set as follows:

Set $T_b = 2*T_a$

Choose $EA_{min}$ and $EA_{max}$ such that $EA_{min} < EA_{true} < EA_{max}$

Set $EA_{algorithm} = (EA_{min} + EA_{max})/2$, where $EA_{min}$ and $EA_{max}$ are estimated lower and upper bounds of the actual EA.

18. The system of claim 17, wherein the registration error growth rate is positive if $EA_{algorithm} > EA_{actual}$ and negative if $EA_{algorithm} < EA_{actual}$.

19. The system of claim 18, wherein the second control mechanism is further operative to:
adjust the parameter $EA_{algorithm}$ according to the following rules:
IF (rate)>0

Set $EA_{max} = EA_{algorithm}$

Set $EA_{algorithm} = (EA_{min} + EA_{max})/2$

IF (rate)<0

Set $EA_{min} = EA_{algorithm}$

Set $EA_{algorithm} = (EA_{min} + EA_{max})/2$.

* * * * *